United States Patent
Dixon et al.

(10) Patent No.: US 7,834,749 B2
(45) Date of Patent: Nov. 16, 2010

(54) STOWABLE ANTENNA FOR TPMS SENSOR

(75) Inventors: Bryn James Dixon, Bletchley (GB); Aldrian Simon Nowell, Chipping Norton (GB)

(73) Assignee: Transense Technologies PLC (GB)

( * ) Notice: Subject to any disclaimer, the term of this patent is extended or adjusted under 35 U.S.C. 154(b) by 261 days.

(21) Appl. No.: 12/120,417

(22) Filed: May 14, 2008

(65) Prior Publication Data
US 2008/0272901 A1 Nov. 6, 2008

(30) Foreign Application Priority Data
Nov. 13, 2007 (GB) ................................ 0722322.5

(51) Int. Cl.
*B60C 23/00* (2006.01)

(52) U.S. Cl. .................... 340/447; 73/146; 73/146.5; 340/442

(58) Field of Classification Search ............. 340/447, 340/539.1, 442; 73/146, 146.8, 146.5, 146.2; 343/806, 895
See application file for complete search history.

(56) References Cited

U.S. PATENT DOCUMENTS

| | | | |
|---|---|---|---|
| 4,531,112 A * | 7/1985 | Thomas ...................... | 340/447 |
| 5,837,891 A * | 11/1998 | Bridge ....................... | 73/146.8 |
| 2002/0025827 A1* | 2/2002 | Song ........................... | 455/550 |
| 2006/0144132 A1* | 7/2006 | Shimura ...................... | 73/146 |
| 2006/0243041 A1* | 11/2006 | Shimura ...................... | 73/146 |
| 2006/0290588 A1* | 12/2006 | Forster et al. ............... | 343/806 |

FOREIGN PATENT DOCUMENTS

| | | |
|---|---|---|
| EP | 1609626 A1 | 12/2005 |
| WO | WO2007039607 A1 | 4/2007 |

OTHER PUBLICATIONS

Intellectual Property Office Search Report under Section 17(5) for GB0722322.5. Feb. 28, 2008. (3 pages).

* cited by examiner

*Primary Examiner*—Davetta W Goins
*Assistant Examiner*—Hoi C Lau
(74) *Attorney, Agent, or Firm*—Keusey & Associates, P.C.

(57) ABSTRACT

A tire pressure monitoring system (TPMS) sensor assembly 1 has a housing 2, a pressure sensor mounted in the housing 2 and an antenna 3 connected to the sensor and extending exteriorly of the housing 2 for effecting wireless communication between the sensor and a remote module. The antenna 3 is moveable between a folded position in which it extends around at least a part of the housing 2 so as to lie substantially in the plane of the housing 2 and an erect position in which it upstands from the housing 2 so as, in use, to extend into the inflation area formed between a wheel and tire. The antenna 3 is biased towards its erect position, and further includes a releasable restraining strap 7 for restraining the antenna 3 in its folded position.

14 Claims, 4 Drawing Sheets

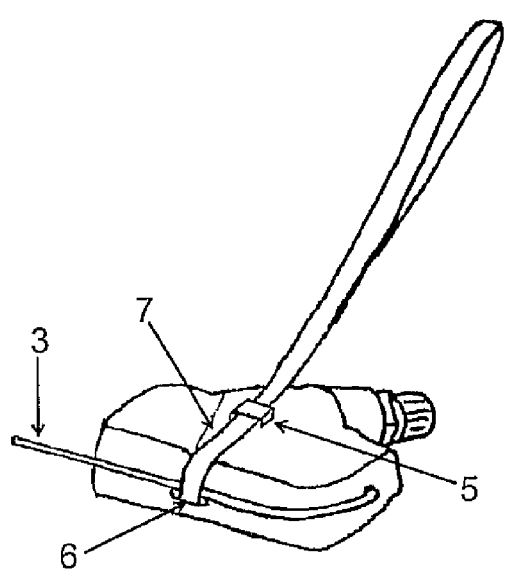
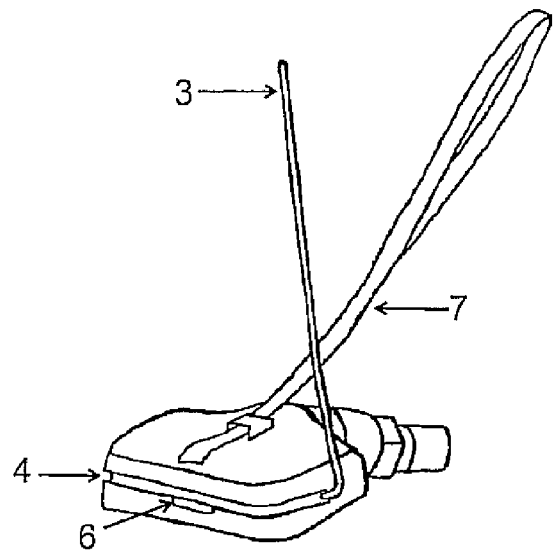
Fig. 2a                    Fig. 2b
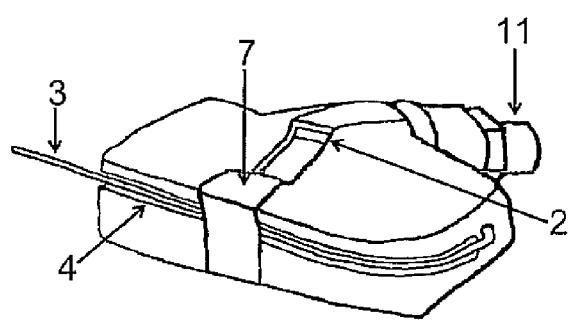
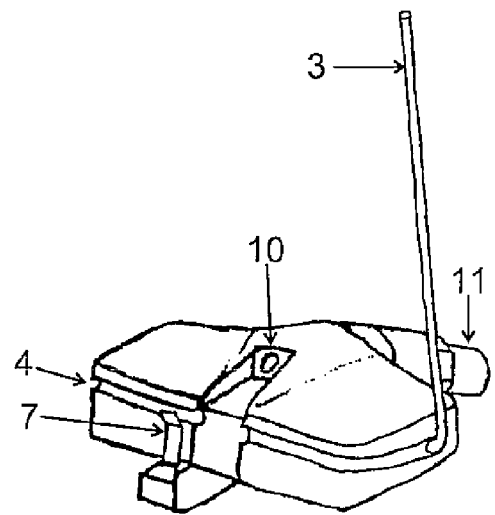
Fig. 3a                    Fig. 3b

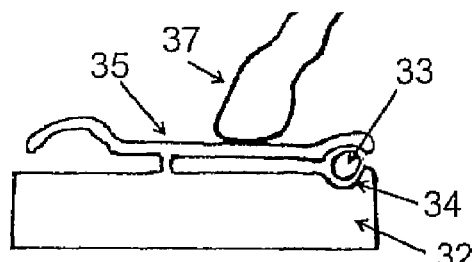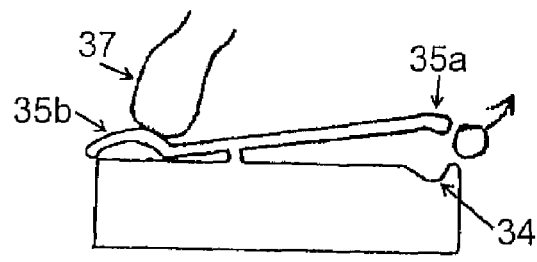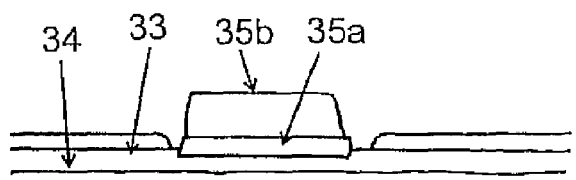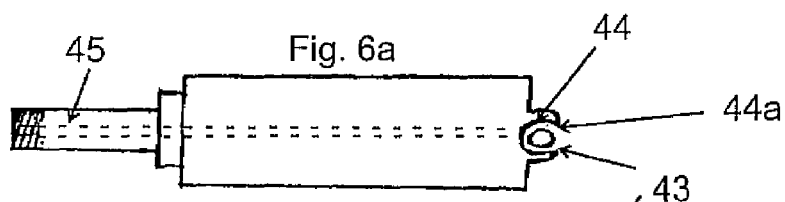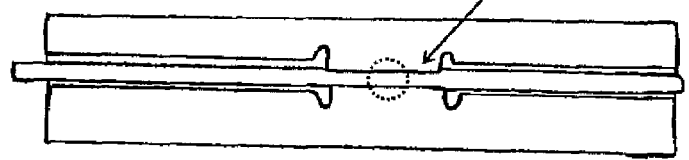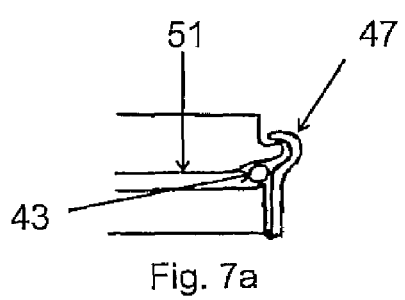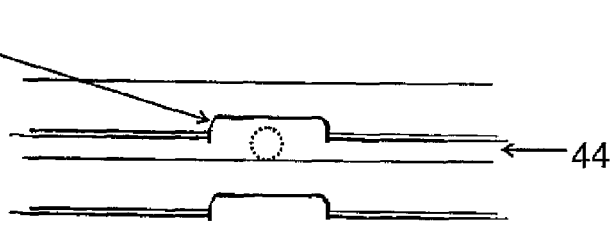

STOWABLE ANTENNA FOR TPMS SENSOR

BACKGROUND OF THE INVENTION

1. Field of the Invention

The present invention relates to wireless tire pressure monitoring system (TPMS) sensors and more particularly to such sensors which have an external aerial for achieving wireless communication with a receiver unit.

2. The Prior Art

Wireless sensors are well known for use in tire pressure monitoring systems, the sensor being located within the inflation area of a wheel/tire assembly so as to be exposed to the pressurised fluid contained therein and then communicating wirelessly, such as by R/F communication, with a receiver located remotely from the wheel, such as in the wheel arch. In order, then, to achieve the necessary communication, the sensor must include some sort of antenna for broadcasting and receiving signals. In some designs, the antenna is enclosed within the sensor housing, but for some applications, this arrangement has been found not be produce acceptable results and instead an external aerial is provided on the sensor which typically extends away from the sensor into the space formed between the wheel and tire when inflated. However, this presents problems when a tire is being fitted to a wheel. As the bead of the tire is moved across the outer surface of the wheel during fitting, it can engage the antenna unless care is taken by the fitter, resulting in damage to the aerial and hence reducing the range of the sensor or even preventing wireless communication altogether.

SUMMARY OF THE INVENTION

According to the present invention there is provided a TPMS sensor assembly having a housing, a pressure sensor mounted in the housing and an antenna connected to the sensor and extending exteriorly of the housing for effecting wireless communication between the sensor and a remote module, the antenna being moveable between a folded position in which it extends around at least a part of the housing so as to lie substantially in the plane of the housing and an erect position in which it upstands from the housing so as, in use, to extend into the inflation area formed between a wheel and tire, the antenna being biased towards its erect position, and further including releasable restraining means for retraining the antenna in its folded position.

A sensor assembly in accordance with the present invention has the advantage that the antenna can be stored in its folded position during installation of the sensor on a wheel and more particularly when a tire is being fitted, in which position the antenna is significantly less likely to be damaged, and can then be released for use after the tire has been fitted and the risk of damage passed.

Preferably, the antenna is formed of a resiliently deformable material so that it can be bent into its folded position, the memory of the material causing the antenna to spring back to its erect position for use automatically when released from its folded position without the need for any additional biasing means. Alternatively, the antenna may be formed of a flexible material or may have a pivot mount which enables it to be moved into a folded position, separate biasing means such as a spring or the like then being provided to urge the antenna into its erect position.

Preferably, the housing has a slot formed therein into which the antenna folds so as to be substantially flush with the surface of the housing when in its folded position.

The restraining means may be manually releasable by the person fitting the tire or may be released automatically after the tire has been fitted. In the case of manual release, the restraining means, in one embodiment, takes the form of a strap which overlies the folded antenna so as to hold it against the housing. Once the tire has been moved over the housing so that the risk of damage to the antenna has passed, the strap is pulled by the fitter, releasing the antenna to spring to its erect position.

In the case of automatic release of the restraining means, this may be achieved through interaction of the restraining means with the tire bead as it passes over the housing. For example, the restraining means may be a catch provided on the housing into which the antenna clips, the bead engaging the catch as it passes over the housing releasing it. The catch may, for example, be a pivot lever which is biased into one position for restraining the antenna and is pivoted into a second position in which the antenna is released by the tire bead. The catch could also be a use once arrangement which is fractured or otherwise released by the tire bead so as to detach from the housing and thereby release the antenna.

In an alternative arrangement, the restraining means may be configured to release the antenna when air is supplied to the tire. This may be achieved by the restraining means interacting with the air as it comes through the inflation valve, the pressure of the incoming air moving or otherwise releasing the restraining means so as to release the antenna. For example, the restraining means such as a strap may extend across the inflation valve so as to block it, the inflation air blowing the restraining means out of the way, causing release of the antenna. In another arrangement, the restraining means may be responsive to the pressure surrounding the housing, releasing the antenna when the pressure reaches a predefined level. For example, a small balloon or the like may be positioned to block an opening through which the antenna must pass in order to be released and thereby the antenna is held in its folded position, the size of the balloon decreasing as the pressure in the tire increases until it is small enough to pass through the opening, thereby freeing the antenna. The pressure dependent release systems have the advantage that the tire will need to be partially inflated before the antenna is released, thereby further avoiding the possibility of damage due to the weight of the wheel and possibly the vehicle sitting on the antenna once it has been released if the orientation of the wheel happens to be with the antenna pointing downwards.

It will, of course, be understood that the manual release may also be used in combination with an automatic release system, the automatic release system operating as a fail safe in the event that the manual release is forgotten or does not operate properly.

BRIEF DESCRIPTION OF THE DRAWINGS

In order that the invention may be well understood, there will now be described some embodiments thereof given by way of example, reference being made to the accompanying drawings, in which:

FIG. 2a is a perspective view of the assembly of FIGS. 1a to 1c with the antenna stowed;

FIG. 2b is a perspective view of the assembly of FIG. 2a with the antenna released;

FIG. 3a is a perspective view of an assembly according to second embodiment with the antenna stowed;

FIG. 3b is a perspective view of the assembly of FIG. 3a with the antenna released;

FIGS. 5a to 5c are diagrammatic illustrations of a restraining system according to a fourth embodiment of the invention;

FIGS. 6a and 6b are diagrammatic illustrations of a restraining system according to a fifth embodiment;

FIGS. 7a and 7b are diagrammatic illustrations of a restraining system according to a sixth embodiment;

FIGS. 5a to 8d are diagrammatic illustrations of a restraining system according to a seventh embodiment;

DETAILED DESCRIPTION OF THE PREFERRED EMBODIMENTS

Referring first to FIGS. 1a to 2c, there is shown a sensor assembly, generally indicated at 1, comprising a housing 2 in which is mounted a tire pressure monitoring sensor (not shown). The sensor itself may be of any conventional type and will not be described in any detail here. Extending from the housing 2 is an antenna 3, which is connected to the sensor inside the housing 2 for enabling wireless RF communication between the sensor and a remote monitoring assembly (not shown) in a well known manner.

Figure 1C:
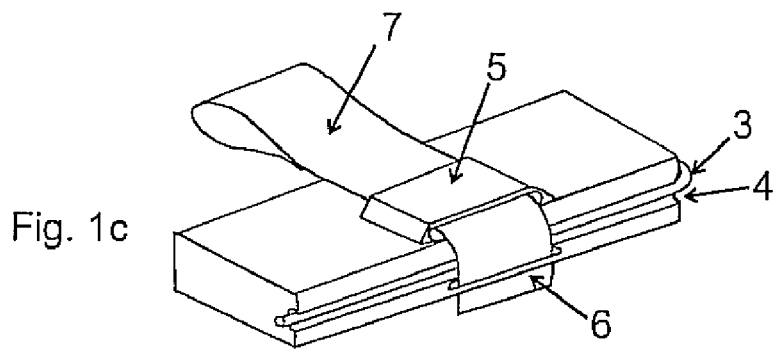
FIGS. 1a to 1c are diagrammatic illustrations of a sensor assembly according to a first embodiment of the invention.
Figure 1A:
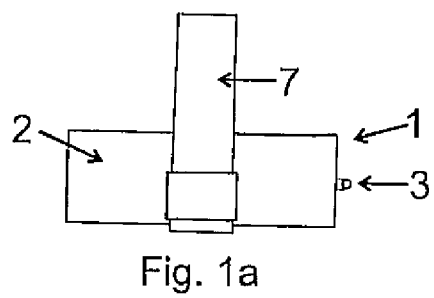
Figure 1B:
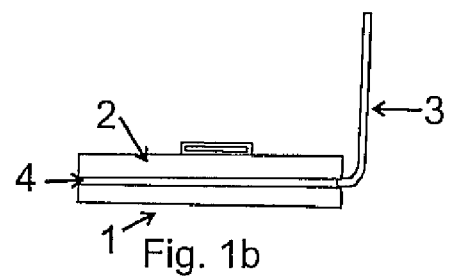

The antenna is made of a resiliently flexible material such as Ormiston 1×7 0.6 mm with heat shrink and when unrestrained, upstands from the housing 2 as shown in FIG. 2b so as, in use, to extend into the pressurised chamber formed between a wheel and a tire with which the sensor is being used. A channel or groove 4 extends laterally around the side of the housing from the point at which the antenna 3 passes through, the antenna 3 being foldable so as to lie in the channel substantially flush with the housing 2, as shown in FIGS. 1c and 2a, in which position it is protected from damage during fitting of a tire.

The housing 2 has a guide loop 5 formed on its upper surface proximate to the channel 4 and a retaining slot 6 formed in a lower edge again proximate to the channel 4, the loop 5 and slot 6 being located on opposing transverse sides of the channel 4, so that a strap 7 can be fed through the loop 5, extend transversely across the channel 4 and engage in the slot 6 so as to be held in position. In this way, the antenna can be retained in the channel 4 by the strap 7 as shown in FIG. 2a.

In order, then, to release the antenna, the free end 7a of the strap 7 is pulled by the installer, withdrawing the other end 7b of the strap from the slot 6. The tension in the antenna 3 will then push the strap 7 away from the channel 4, releasing the antenna to raise to its erect position as shown in FIG. 2b.

FIGS. 3a and 3b show a version of the assembly of the first embodiment modified for automated release of the antenna. The retaining strap 7 extends across and is retained upon an opening 10 in the housing 2 linked to the inflation valve 11, so that when air is applied to the inflation valve, the air pressure lifts the strap 7, releasing it from the housing and hence releasing the antenna to move to its erect position. In all other respects, the system of the second embodiment is identical to that of FIGS. 1a to 2b.

Figure 4A:
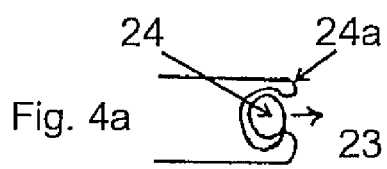
FIGS. 4a to 4c are diagrammatic illustrations of a restraining system according to a third embodiment of the present invention.
Figure 4B:
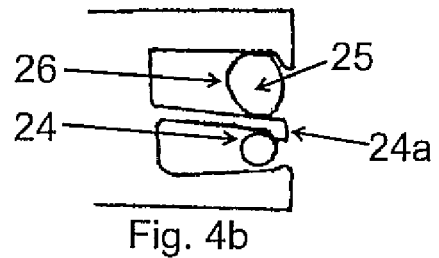
Figure 4C:
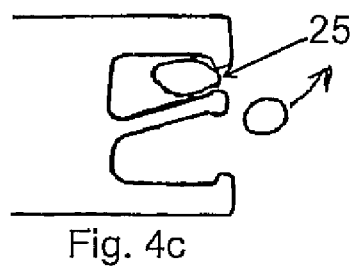

Referring next to FIGS. 4a and 4b, an alternative retaining system for the antenna 23 is shown. The channel 24 in the housing 22 has a constriction at the entry which operates to retain the antenna in the channel 24 once it has been inserted. In order to enable the antenna to be inserted laterally into the channel 24 the upper side 24a of the channel 24 is deformable upwards as shown in FIG. 4c. An air filled balloon 25 or the like is located in an opening 26 positioned above the upper side 24a of the channel 24 which is sufficiently inflated under ambient conditions to retain the upper side 24a of the channel 24 from deforming upwards and prevents the antenna 23, once inserted, from escape from the channel 24.

In order to engage the antenna 23 in the channel 24 ready for installation, the antenna 23 is pressed into the channel 24 with the balloon 25 absent from the opening 26 so that the upper surface 24a is free to deform. Once the antenna 24 is in position, the balloon 25 is pressed into the opening 26, preventing the upper surface 24a from deforming and hence antenna from releasing.

Once the tire has been fitted to the wheel, air is added to the tire in the usual way. As the pressure in the tire increases, the balloon 25 is compressed until it is no longer sufficiently resilient to prevent deformation of the upper surface 24a, at which point the antenna 23 is released from the channel 24 to spring to its erect position.

FIG. 5a then shows a still further embodiment for automated release of the antenna from the channel 34. The housing 32 includes a pivot latch 35 which extends across the open side 34a of the channel 34. The latch 35 is biased by a spring or the like into a closed position in which a claw 35a formed on the end the latch 35 presses against the open side 34a of the channel 34, retaining the antenna in the channel 34. As a tire is fitted onto the wheel, the bead 37 of the tire moves across the housing 32 of the sensor assembly, passing first over the channel 34 and the antenna 33 housed therein before engaging a release lever 35b of the latch 35. Engagement with the release lever 35b creates a moment which pivots the claw 35a away from the channel 34 and thereby releasing the antenna from its retained position.

A still further automated release system is shown in FIGS. 6a and 6b. The channel 44 for stowing the antenna 43 extends across an inflation passage which is substantially obstructed when the antenna is engaged in the channel 44. A clip is formed at the mouth 44a of the channel which is resiliently deformable to allow the antenna to be pressed into the channel 44 when sufficient insertion force is applied and is sufficiently stiff to prevent the antenna from escaping the channel under is normal biasing force which urges it towards its erect position. When compressed air is applied to the inflation valve 45, the increased load exerted through the antenna 43 against the clip is then sufficient to open the clip, releasing the antenna 43 to spring to its erect position.

Figure 8A:
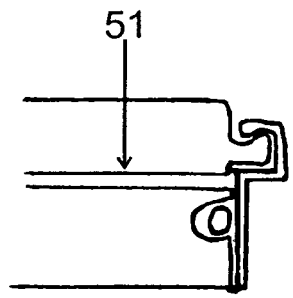
Figure 8B:
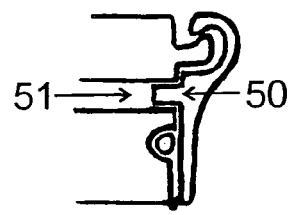
Figure 8C:
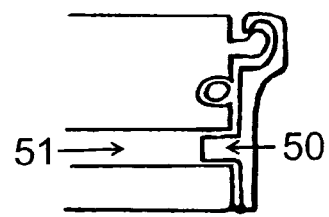
Figure 8D:
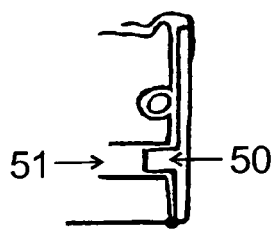

The embodiments of FIGS. 7a to 8d are variants of the assembly of FIGS. 6a and 6b, in each case having a retainer 47 which latches across the antenna 43 to retain it in the channel 44, the retainer 47 closing or at least obstructing an air passage such that, when pressurised air is applied to the inflation valve, the air pressure acting against the retainer causes the latch to release, thereby freeing the antenna. These embodiments differ from that of FIG. 6 in that the air pressure is applied directly against the retainer rather than against the antenna. As shown in FIGS. 8b to 8d, the latch may include a projection 50 which engages in an air inflation duct 51 when latched closed so as to plug it, the application of inflation air applying pressure to the face of the projection 50 so as to urge it out of the duct 51 and hence release the latch.

Figure 9B:
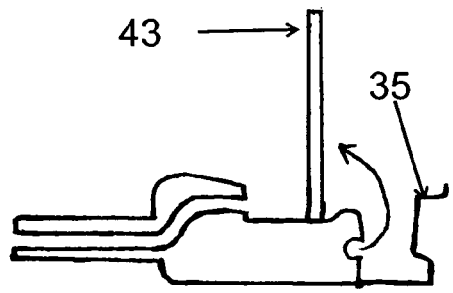
FIGS. 9a to 9c are diagrammatic illustrations of a restraining system according to a eighth embodiment.
Figure 9A:
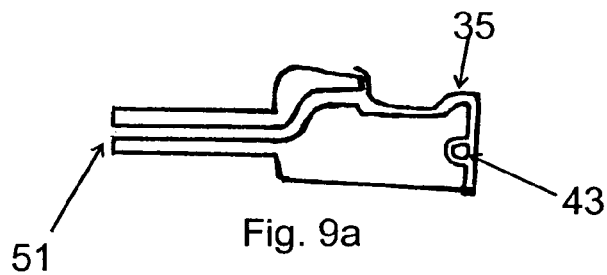
Figure 9C:
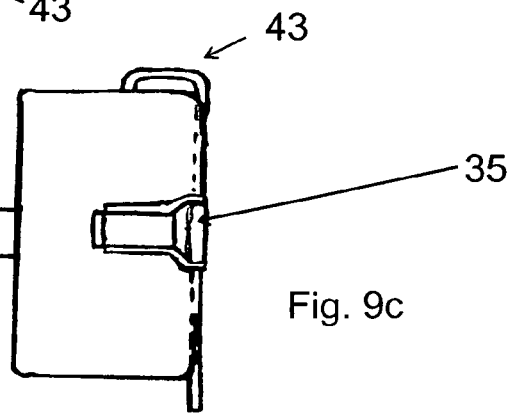

FIG. 9a to 9c shows a further embodiment which functions in a similar manner to that of FIGS. 6a and 6b, the inflation air impacting on the latch to release the retainer and hence release the antenna. In this case, the retainer clips over a projection on the housing and extends towards the inflation duct, the end of the retainer forming a trigger against which the inflation air impacts as shown in FIG. 9a.

Figure 10A:
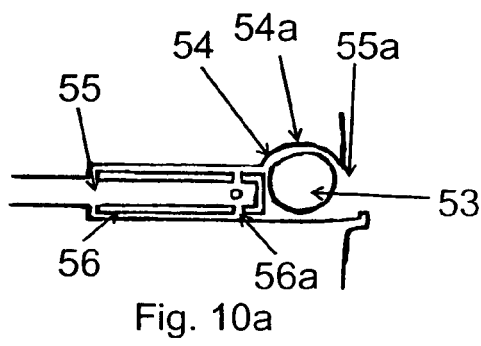
FIGS. 10a and 10b are diagrammatic illustrations of a restraining system according to a ninth embodiment.
Figure 10B:
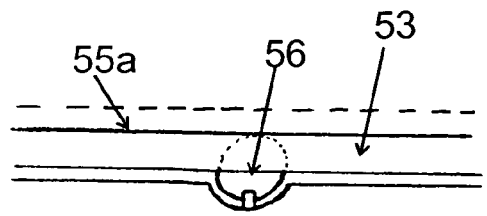

Finally, FIGS. 10a and 10b show a still further embodiment in which the antenna 53 hooks into a channel 54 formed as an undercut in the mouth 55a of an air entry tube 55. The antenna is biased to spring upwards towards the top 54a of the undercut so that it is retained in position but its own biasing load. A piston 56 is located in the air entry tube 55 upstream of the mouth, which, upon application of inflation air, is pressed against the antenna so as to urge it towards the mouth 55a. The slop of the undercut develops a camming action with the antenna 53 causing it to lift away from the top 54a of the undercut as it moves towards the mouth 55a against its biasing load until is passes through the mouth, whereupon it will spring to its erect position. The piston 56 includes relief ports 56a which are exposed when the piston has moved far enough along the tube 55 to release the antenna. Once exposed, the inflation air will exist through the relief ports 56a and pass into the tire and hence the piston movement is arrested.

It will, of course, be understood that the automated, air pressure actuated release systems may be used in conjunction with the manual release systems. For example, the strap in the system of FIGS. 3a and 3b may be extended so that it can be used to manually release the antenna as an alternative to automated release by the air pressure.

What is claimed is:

1. A tire pressure monitoring system (TPMS) sensor assembly comprising:
   a housing and a pressure sensor mounted in the housing; and
   an antenna connected to the sensor and extending exteriorly of the housing for effecting wireless communication between the sensor and a remote module, the antenna being moveable between a folded position in which it extends around at least a part of the housing so as to lie substantially in the plane of the housing and an erect position in which it upstands from the housing so as, in use, to extend into the inflation area formed between a wheel and tire, the antenna being biased towards its erect position, and further including releasable restraining means for restraining the antenna in its folded position, wherein said restraining means releases automatically after the tire has been fitted at least to a point at which there is no further danger of damage to the sensor.

2. The sensor according to claim 1, wherein the housing has a slot formed therein into which the antenna folds so as to be substantially flush with the surface of the housing when in its folded position.

3. The sensor according to claim 1, wherein the restraining means is adapted to be manually releasable by the person fitting the tire.

4. The sensor according to claim 3, wherein the restraining means comprises a strap which extends across the antenna in its folded position to hold it in place, the strap being adapted to be releasable by a tire fitter in order to release the antenna.

5. The sensor according to claim 1, wherein the restraining means is released by air pressure arising from inflating the tire after fitting.

6. The sensor according to claim 5, wherein the restraining means includes a resiliently compressible member which interacts with the antenna in its folded position to hold it in place, the compressible member being compressed as the air pressure in the tire increases, the antenna being released when the compressible member has been sufficiently compressed that it is no longer effective to retain the antenna.

7. The sensor according to claim 5, wherein the one of the antenna in its folded position and the restraining means interacts directly with compressed air applied to an air inflation valve, the restraining means being moveable by said compressed air so as to release the antenna.

8. The sensor according to claim 7, wherein the restraining means at least partially obstructs the passage of inflation air entering the tire so as to be blown away from said passage, thereby releasing the antenna.

9. The sensor according to claim 8, wherein the restraining means comprises a strap which extends across an outlet of the air inflation passage.

10. The sensor according to claim 8, wherein the restraining means comprises a clip.

11. The sensor according to claim 10, wherein the clip includes a projection which engages in an outlet opening of the air inflation passage in a closed position so as to plug the passage.

12. The sensor according to claim 7, wherein the antenna extends across the air inflation passage so as at least partially to obstruct it, the force on said antenna resulting from the air pressure being transmitted through the antenna to the restraining means so as to effect release thereof.

13. The sensor according to claim 1, wherein the restraining means is released by interaction with the bead of the tire as it is fitted onto a wheel on which the sensor is attached.

14. The sensor according to claim 13, wherein the restraining means comprising a pivoting clip which is biased into a first pivotal position in which it latches over the antenna to hold it in a folded position, the tire bead engaging the clip during installation of the tire, pivoting it into a second position in which the antenna is released.

* * * * *

UNITED STATES PATENT AND TRADEMARK OFFICE
CERTIFICATE OF CORRECTION

| | | |
|---|---|---|
| PATENT NO. | : 7,834,749 B2 | Page 1 of 1 |
| APPLICATION NO. | : 12/120417 | |
| DATED | : November 16, 2010 | |
| INVENTOR(S) | : Bryn James Dixon and Aidrian Simon Nowell | |

It is certified that error appears in the above-identified patent and that said Letters Patent is hereby corrected as shown below:

Cover page, item (75), line 2, delete "Aldrian" and insert --Aidrian--; and

Column 3, line 13, after "FIGS." delete "5a" and insert --8a--.

Signed and Sealed this
First Day of February, 2011

David J. Kappos
*Director of the United States Patent and Trademark Office*